United States Patent
Piehler et al.

(10) Patent No.: US 10,451,246 B2
(45) Date of Patent: Oct. 22, 2019

(54) MICROLENS ARRANGEMENT AND ILLUMINATION DEVICE FOR UNIFORM ILLUMINATION WITH MICROLENS ARRANGEMENT

(71) Applicant: Jabil Optics Germany GmbH, Jena (DE)

(72) Inventors: Eberhard Piehler, Lehesten OT Nerkewitz (DE); Theresa Kunz, Jena (DE); Gertrud Blei, Jena (DE); Rainer Fischer, Jena (DE)

(73) Assignee: Jabil Optics Germany GmbH, Jena (DE)

( * ) Notice: Subject to any disclaimer, the term of this patent is extended or adjusted under 35 U.S.C. 154(b) by 627 days.

(21) Appl. No.: 14/607,418

(22) Filed: Jan. 28, 2015

(65) Prior Publication Data
US 2015/0219304 A1   Aug. 6, 2015

(30) Foreign Application Priority Data

Jan. 31, 2014  (DE) .................. 10 2014 201 749

(51) Int. Cl.
*G02B 3/00* (2006.01)
*F21V 5/00* (2018.01)

(52) U.S. Cl.
CPC ............... *F21V 5/004* (2013.01); *G02B 3/00* (2013.01)

(58) Field of Classification Search
CPC .. F21V 5/004; F21V 5/00; G02B 3/00; G02B 3/0068; G02B 3/0056; G02B 3/0062; G02B 3/14; G02B 9/00; G02B 27/123; G02B 13/22; G02B 5/005
See application file for complete search history.

(56) References Cited

U.S. PATENT DOCUMENTS

| 4,185,191 | A  | * | 1/1980 | Stauffer | G01C 3/32 250/204 |
|---|---|---|---|---|---|
| 5,515,206 | A | * | 5/1996 | Peng | G02B 3/00 359/672 |
| 6,256,149 | B1 | * | 7/2001 | Rolfe | B29D 11/00278 264/215 |
| 2003/0072083 | A1 | * | 4/2003 | Smith | G02B 3/0056 359/619 |
| 2007/0053075 | A1 | * | 3/2007 | Kamo | G02B 13/04 359/733 |

(Continued)

FOREIGN PATENT DOCUMENTS

EP       2 128 694       12/2009
WO   WO-2009/096057    8/2009

*Primary Examiner* — Anh T Mai
*Assistant Examiner* — Fatima N Farokhrooz
(74) *Attorney, Agent, or Firm* — Young Basile Hanlon & MacFarlane, P.C.

(57) ABSTRACT

The invention relates to a microlens arrangement (12) and an illumination device (10) for uniformly illuminating of an area (F), with a light source (11) and a microlens arrangement (12). In order to illuminate the area (F) to be illuminated as homogeneously as possible, the at least one microlens (1) of the microlens arrangement (12) has an entrance face (2) which is shaped such that monochromatic light incident on the microlens (1) and propagating parallel to the optical axis (O) is refracted by the entrance face (2) such that back focal lengths (S1, S2, S3) of the light with the optical axis (O) increase with the height of incidence (E1, E2, E3).

9 Claims, 2 Drawing Sheets

(56) References Cited

U.S. PATENT DOCUMENTS

| | | | |
|---|---|---|---|
| 2008/0037131 A1* | 2/2008 | Steenblik | B44F 1/10 |
| | | | 359/619 |
| 2010/0270907 A1 | 10/2010 | Yamaguchi et al. | |
| 2011/0304837 A1* | 12/2011 | Patra | G02B 27/48 |
| | | | 355/67 |
| 2015/0304027 A1* | 10/2015 | Nciri | G01J 3/10 |
| | | | 398/119 |
| 2015/0352882 A1* | 12/2015 | Jolic | G02B 3/0056 |
| | | | 359/619 |

* cited by examiner

MICROLENS ARRANGEMENT AND ILLUMINATION DEVICE FOR UNIFORM ILLUMINATION WITH MICROLENS ARRANGEMENT

CROSS-REFERENCE TO RELATED PATENT APPLICATIONS

This application claims priority to Germany Application 102014201749.1, filed Jan. 31, 2014 including the specification, drawings, claims and abstract, is incorporated herein by reference in its entirety.

SUMMARY

The invention relates to a microlens arrangement having a plurality of microlenses arranged side-by-side and transversely to an optical axis of the microlens arrangement, wherein the microlenses have an entrance face and an exit face, through which light beams pass during the operation of the microlens arrangement. The invention further relates to an illumination device for uniformly illuminating an area, with a light source and a microlens arrangement that can be illuminated by the light source.

Microlens arrangements and illumination devices with microlens arrangements are generally known. Microlens arrangements are used, for example, to distribute light from a light source uniformly on an area to be illuminated. However, conventional illumination devices require at least one additional lens for correcting the distortion, so that the conventional illumination devices cannot be constructed compactly. However, the illumination is distorted without lenses for correcting the distortion and therefore not uniform. Furthermore, the area to be illuminated can be peripheral, thereby further reducing the uniformity of the illumination.

It is therefore the object of the disclosure to provide a microlens arrangement and an illumination device with which an area can be illuminated with higher quality, even when the area is peripheral.

This object is attained with the aforementioned microlens arrangement by forming the entrance face of at least one of the microlenses so that light beams incident on the microlenses and aligned parallel to the optical axis and having the same wavelength and different heights of incidence each intersect the optical axis with a different back focal length, wherein the entrance face is shaped such that the back focal length increases with the height of incidence. This object is attained with the illumination device of the aforementioned type in that the microlens arrangement is a microlens arrangement according to the invention.

The microlens arrangement may have a plurality of microlenses that are arranged side-by-side or one behind the other and transversely to the optical axis of the microlens arrangement, wherein light propagating along the optical axis can pass through the microlenses at the same time. The microlenses may be arranged in the microlens arrangement in a uniform pattern and, for example, in a matrix or in a honeycomb pattern. The microlens arrangement may include, for example, 5×7 microlenses provided in the matrix or the honeycomb pattern. A width and height or a clear aperture of the microlens arrangement is, for example, 5.63 mm×5.75 mm, wherein each of the microlenses has a width and height or a clear aperture of 0.8 mm×0.52 mm.

Due to the inventive design of the entrance face, monochromatic light beams propagating parallel to the optical axis and light incident on the object side of the microlens are distributed more uniformly along the optical axis already by the entrance face than with conventional microlens arrangements, wherein light beams propagating parallel to the optical axis and having different heights of incidence intersect the optical axis only in one focal spot having the narrowest possible size, i.e. with a substantially identical back focal length. The spatial extent of the focal spot is limited by aberrations. This in itself already results in a more uniform illumination of the image-side area to be illuminated. The back focal length that depends on the height of incidence can be easily determined optically or calculated by ray tracing.

The solution of the disclosure can be further improved by various advantageous embodiments each have their own advantages, but which can be freely combined with one another. These embodiments and their associated advantages will be discussed below, wherein the design measures and their effects are described only for a single exemplary microlens of the microlens arrangement. Of course, several or all of the microlenses of the microlens arrangement may be shaped according to the invention.

In a first advantageous embodiment of the microlens arrangement, the entrance face may have a paraxial and an abaxial section, wherein the refractive power of the entrance face decreases from the paraxial section toward the abaxial section. Paraxial light beams propagating parallel to the optical axis and having the same wavelength intersect the optical axis with a shorter back focal length than light beams propagating parallel to the optical axis and entering the microlens through the abaxial section that is farther away from the optical axis.

Microlenses are much smaller than conventional lenses. To enable the incident light beams of different height of incidence to intersect the optical axis over the largest possible area for a better distribution, the entrance face can be formed so that points of intersection of paraxial light beams with the optical axis are located within the microlens and points of intersection of light beams with the optical axis passing through the entrance face in a peripheral area of the microlens are located outside the microlens. In particular in the propagation direction of the light beams, i.e. from the entrance face towards the exit face, the points of intersection of paraxial light beams with the optical axis may be located in front of the points of intersection of the abaxial light beams and especially in front of the points of intersection with the optical axis of light beams passing through the entrance face in the peripheral region of the microlens. The light beams passing through the peripheral region may intersect the optical axis behind the exit face as viewed from the entrance face.

Preferably, the exit face is configured to image peripheral points of the entrance face onto the area to be illuminated with the smallest possible distortion. This obviates the need for a separate imaging device having one or more lenses for correcting the distortion. This allows the illumination device to be more compact than conventional illumination devices that require a separate imaging device for correcting the distortion. The quality of the illumination does not degrade for the illumination device according to the invention compared to conventional illumination devices having a separate imaging device for correcting the distortion.

The entrance face thus distributes the incident light beams along the optical axis as a function of the height of incidence, with the exit face imaging the peripheral points of the entrance face without distortion. The exit face imaging the periphery of the entrance area onto the preferably planar surface to be illuminated thus allows uniform illumination of a pre-defined and, for example, rectangular area, for example a screen or another projection surface. The shape of the edge of the entrance face is similar to or preferably corresponds to the shape of the area to be illuminated.

Frequently, the areas to the illuminated are to be illuminated not with a round or oval light spot, but rather with a square or rectangular light spot. To be able to illuminate the area with a rectangular, square, or any other desired shape, it is thus sufficient to shape the periphery of the entrance face commensurate with the desired shape of the illumination.

An object-side focal length of the exit face and/or the focal length of the entrance face may be different from a center thickness of the microlens and in particular greater than or less than the center thickness. The focal length of the exit face can be determined, when the exit face is part of a lens having a flat entrance face that is arranged perpendicular to the optical axis of this lens. Because the exit face then does not image a section of the entrance face intersecting the optical axis, the degree of distortion is reduced and the area is illuminated more uniformly. Similarly, the focal length of the entrance face can be determined, namely, when the entrance face is a part of a lens having a flat exit face that is arranged perpendicular to the optical axis of this lens.

The exit face may be formed less aspherical than the entrance face. In particular, aspherical parameters for the exit face of an aspherical formula describing the shape of the exit face and the entrance face may be smaller than those for the entrance face. Such an exit face can be more easily manufactured than the entrance face, wherein the ease of manufacture does not impair the quality of the illumination, in particular the uniformity or the degree of distortion.

In order to illuminate the area even more uniformly with the illumination device, even when the area is tilted and abaxial, the optical axis of the microlens arrangement may be tilted relative to another optical axis of the illumination device. The optical axis of the microlens arrangement is tilted relative to the other optical axis, for example, in a range between 0.5° and 2°. Preferably, the optical axis of the microlens arrangement has a tilt of 1° relative to the other optical axis of the illumination device.

The homogeneity of the illumination of the tilted or off-center area can be further improved by arranging the light source at a distance from another optical axis of the illumination device. For example, the light source may be arranged at a distance between −0.5 mm and 2 mm, and in particular at a distance of −0.2 mm from the other optical axis.

As a light source that is small compared to the dimensions of the microlens arrangement transversely to the optical axis, such as an LED (light emitting diode), may be used as a light source. In order to be able to illuminate the microlens arrangement over a large area, wherein the light beams are optionally incident on the microlenses as parallel as possible relative to the optical axis of the microlens arrangement, the illumination arrangement may include a collimator. The collimator is, for example, a collimating lens or a device with several lenses with a diameter or width and height or a free aperture of 5.5 mm. In particular, it may be sufficient for the illumination device to have only a single collimating lens.

The light source may be arranged in an object-side focal plane of the collimator. Preferably, the collimator is provided between the light source and the microlens arrangement along an optical path extending from the light source to the microlens arrangement. The light is guided along the optical path from the light source to the microlens arrangement. The optical axis of the collimator is preferably the other optical axis of the illumination device, with respect to which the microlens arrangement may be tilted or from with respect to which the light source may be spaced.

The illumination device is, for example, an illumination device of a barcode reader with which the barcodes can be illuminated so uniformly that the barcode reader can quickly and reliably recognize the barcodes.

The invention will now be described with reference to exemplary embodiments and the drawings. The different features of the embodiments can be combined independently, as was already described for the individual advantageous embodiments.

BRIEF DESCRIPTION OF THE DRAWINGS

It is shown in.

DETAILED DESCRIPTION

First, the design and function of a microlens arrangement according to the invention are described with reference to the exemplary embodiment of FIG. 1.

Figure 1:
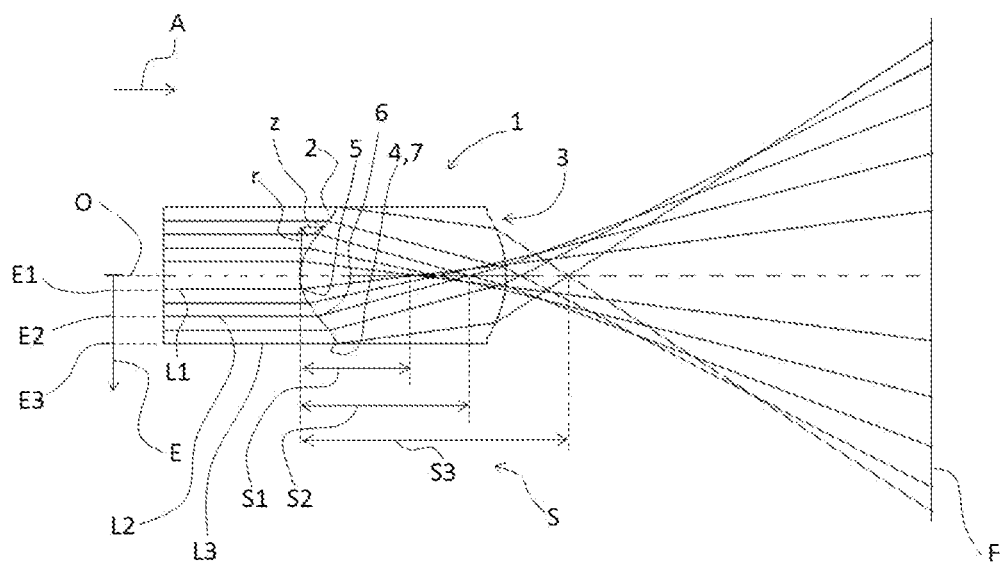
FIG. 1 an exemplary embodiment of a microlens of a microlens arrangement according to the invention.

FIG. 1 shows a microlens 1 which is schematically depicted in cross-section along its optical axis O. The microlens 1 is part of a microlens arrangement. The microlens arrangement has a plurality of microlenses, of which at least one is the microlens 1. In particular, several or all of the microlenses of the microlens arrangement may be microlenses 1 according to the invention.

In the exemplary embodiment of FIG. 1, monochromatic light propagating in a propagation direction A parallel to the optical axis O is incident on an entrance face 2 of the microlens 1. The entrance face 2 is oriented opposite to the propagation direction A and is curved outwardly aspherically opposite to the propagation direction A. The microlens 1 has an exit face 3 located downstream of the entrance face in the propagation direction A, through which the light that has entered the microlens 1 through the entrance face 2 exits the microlens 1 during operation. In the illustrated exemplary embodiment, the exit face 3 is curved outwardly in the propagation direction A. The microlens 1 of the exemplary embodiment of FIG. 1 is thus a bi-convex lens.

The entrance face 2 is preferably designed so that monochromatic light incident into the microlens 1 and propagating parallel to the optical axis O intersects the optical axis O with different back focal lengths S depending on a height of incidence E, wherein the back focal length S increases with the height of incidence E. To illustrate the dependence of the back focal length S on the height of incidence E, three light beams L1, L2, L3 are considered in the embodiment of FIG. 1. The light beams L1, L2, L3 impinge on the entrance face 2 at different distances or heights of incidence E1, E2, E3 relative to the optical axis O. The light beam L1 is a paraxial light beam and has in the embodiment of FIG. 1 the smallest distance from the optical axis O. The distance from the optical axis O of the light beam L1 is indicated as a height of incidence E1. The light beam L3 is a so-called peripheral beam that is incident in the microlens 1 through the entrance face 2 in a peripheral region 4. The light beam L3 is incident on the entrance face 2 with the height of incidence E3. The light beam L2 has a height of incidence E2 located between the height of incidence E1 of the first light beam L1 and the height of incidence E3 of the third light beam L3.

The light beams L1, L2, L3 intersect the optical axis O with different back focal lengths S1, S2, S3. The back focal lengths S1, S2, S3 are here the distance between a point of intersection of the optical axis O with the entrance face 2 and a point of intersection of the respective light beam L1, L2, L3 with the optical axis O. The back focal length S1 of the paraxial light beam L1 is here smaller than the back focal length S3 of the peripheral beam L3. The back focal length S2 of the light beam L2 is located between the other back focal lengths S1, S3.

The back focal length S of the light beams L1, L2, L3 thus increases with the height of incidence E and may, for example, depend on the height of incidence E proportionally, disproportionately or nonlinearly.

The exit face 3 is preferably designed to image a periphery of the microlens 1 bordering the peripheral area 4 onto a face to be illuminated F with the lowest possible distortion or even without any distortion. The focal length of the exit face 3 hereby determines the size of the illuminatable area transverse to the optical axis O and ensures a low distortion.

The light beam L1 is incident on the microlens 1 in a paraxial section 5 of the entrance face 2. The light beam L2 is incident on the microlens 1 in an intermediate section 6 of the entrance face 2, which is farther away from the optical axis O than the paraxial section. 5 The light beam L3 is incident on the microlens 1 in an abaxial section 7 of the entrance face 2, wherein the abaxial section is even farther away from the optical axis O than the intermediate section 6. The abaxial section 7 is located for example in the peripheral area 4 of the entrance face 2.

For the description of the aspherical shape of the entrance face 2, the following aspherical formula can be used, which represents the distance z of the entrance face 2 from a plane extending perpendicular to the optical axis O as a function of a distance r from the optical axis O:

$$z(r) = \frac{cr^2}{1 + \sqrt{1 - (1+k)c^2 r^2}} + \alpha_2 r^4 + \alpha_3 r^6 + \alpha_4 r^8$$

For the entrance face 2, the value $\alpha_2$ may be 3.746E+00, the value $\alpha_3$ may be −1.785E+01, and the value $\alpha_4$ may be 1.867E+01. The taper of the entrance face 2 may be, for example −2.87. The microlens 1 may be composed of a suitable glass or an optical plastic and, for example, the glass or plastic AD5503. A center thickness of the microlens 1 is for example 1.51 mm. The apex radius of the entrance face 2, which results from the reciprocal value of the variable c of the above formula, is for example 0.283 mm.

For the exit face 3, the factor $\alpha_2$ may be −2.321E+00, the factor $\alpha_3$ may be 8.635E+00 and the factor $\alpha_4$ may be −1.559E+01. The taper of the exit face 3 may be for example −1.27E+01. The apex radius of the exit face 3, which results from the reciprocal value of the variable c of the above formula, is for example −0.688 mm.

Figure 2:
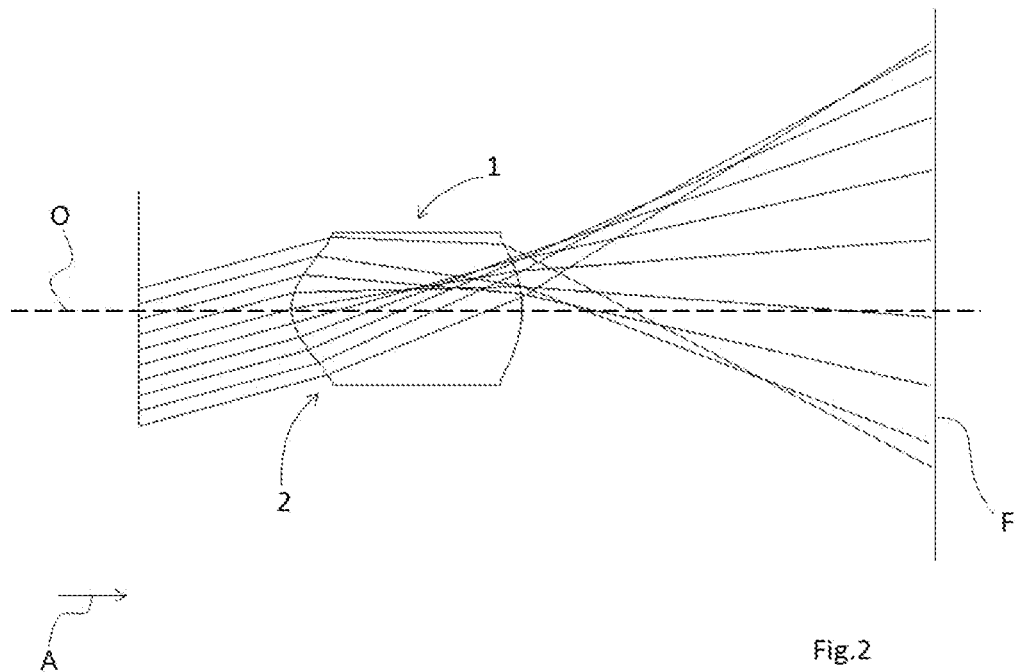
FIG. 2 a schematic diagram of the exemplary embodiment of FIG. 1, with the light beams depicted as being incident into the microlens at an angle relative to the optical axis.

FIG. 2 shows the exemplary embodiment of FIG. 1 in a diagram sectioned along the optical axis O.

The microlens 1 of the exemplary embodiment of FIG. 2 corresponds to the microlens 1 of the exemplary embodiment of FIG. 1. In the exemplary embodiment of FIG. 2, however, light beams that are incident on the entrance face 2 are not light beams propagating parallel to the optical axis O, but are instead parallel light beams propagating at an angle to the optical axis O.

As evident from FIG. 2, the microlens 1 is not only able to evenly distribute light that is incident at an angle over the area F to be illuminated. Rather, the distribution is even more uniform when the light is incident at an angle.

Figure 3:
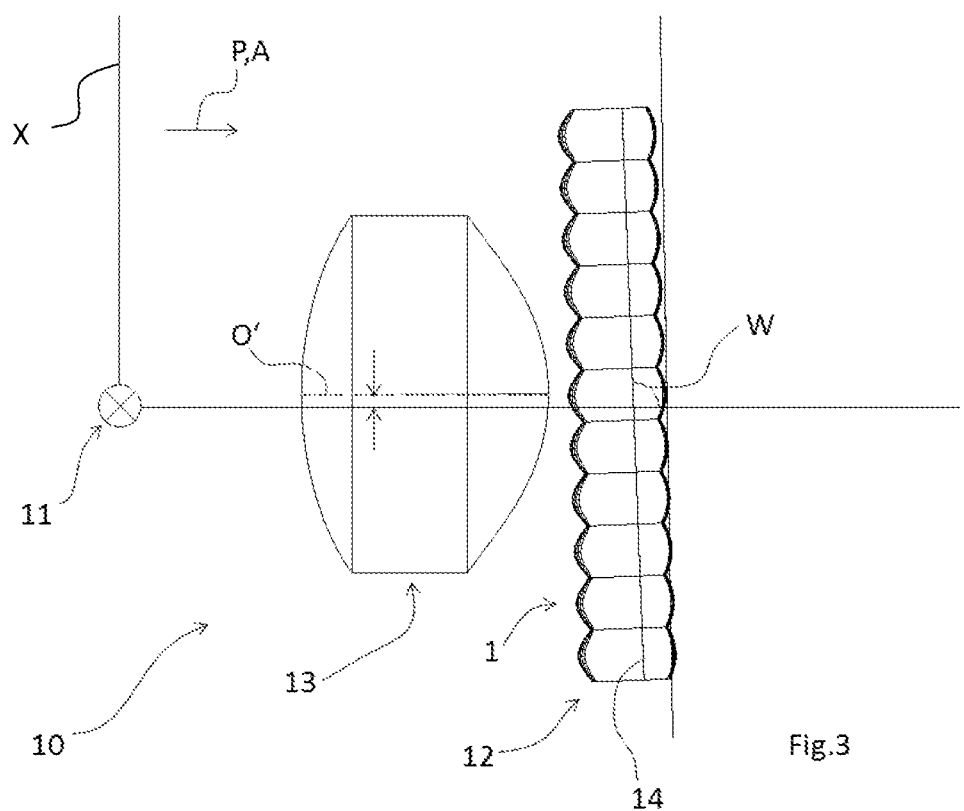
FIG. 3 an exemplary embodiment of an illumination device according to the invention.

FIG. 3 shows schematically a first exemplary embodiment of an illumination device according to the invention in a sectional view along an optical axis of the illumination device. The same reference numerals are used for elements which correspond in their function and/or structure to the elements of the exemplary embodiment of the previous figures. For sake of brevity, only the differences to the previous embodiments will be discussed below.

FIG. 3 shows an illumination device 10 according to the invention with a light source 11 and a microlens arrangement 12. The light source 11 is, for example, a planar emitter configured to illuminate the microlens arrangement 12 and in particular the entrance faces 2 of the microlenses 1 of the microlens arrangement 12 over a large area. However, in the exemplary embodiment of FIG. 3 the light source 11 is not a large-area emitter, but a light source 11 that is rather small in comparison to the microlens arrangement 12 and is, for example, a point light source such as an LED. If the light source 11 is small in relation to the microlens arrangement 12, the illumination device 10 preferably has an additional collimator 13, which is arranged between the light source 11 and the microlens arrangement 12 along an optical path P extending from the light source 11 to the microlens arrangement 12. The collimator 13 is, for example, a collimating lens or includes a plurality of lenses, wherein the light source 11 is preferably arranged in an object-side focal plane X of the collimator 13.

The microlens arrangement 12 includes a plurality of microlenses 1, wherein at least one of the microlenses 1 is designed according to the invention. Alternatively, several or even all of the microlenses 1 of the microlens arrangement 12 may be designed according to the invention.

The proportions of the microlens arrangement 12 and the collimator 13 may differ from the ratios shown in the schematic diagram of the illumination device 10. In particular, the microlenses 1 may be smaller than illustrated in comparison to the collimator 13.

The input faces 2 of the microlenses 1 point to the collimator 13 in a direction opposite to the propagation direction A, and along the optical path P also to the light source 11.

The light source 11 has a transverse offset from the optical axis O' of the collimator 13. Due to the distance of the light source 11 from the optical axis O', during operation of the illumination device 10, light beams emitted by the light source 11 are incident on the entrance face 2 not parallel to the optical axis O of the microlens 1, but at an angle greater than 0. In this way, the area F to be illuminated can be illuminated even more uniformly. Furthermore, the optical axis O of the microlens 1, which is not shown in the FIG. 3, may be tilted and optionally shifted in relation to the optical axis O' of the collimator 13. To illustrate the tilt, a plane 14 extending perpendicular to the optical axis O of the microlens 1 is shown which is arranged not perpendicular to, but instead at an angle W different from 90° with respect to the optical axis O'. The angle W between the optical axis O and the plane 14 is, for example, between 87° and 89.5° and preferably 89°. The tilt also helps to improve the uniformity of the illumination of the area F by increasing the angle between the light beams and the optical axis O. Furthermore, the area to be uniformly illuminated may be off-center and/or shifted.

The collimator 13 is arranged, for example, at a distance of 2.8 mm from the light source 11. For the entrance face of the collimator 13 facing the light source 11 $\alpha_2$ may be −6.500E−04 and $\alpha_3$ may be 2.500E−04. The taper of this entrance face may be −0.46. The vertex radius of this entrance face is preferably 5.55 mm. For an exit face of the collimator 13 facing away from the light source 11 and facing the microlens arrangement 12, the value for $\alpha_2$ may be −5.170E−03, the value for $\alpha_3$ may be −7.400E−04, the value for the taper may be −8.60E−01 and for the vertex radius −3.07 mm. The center thickness of the collimator 13 is for example 3.8 mm.

The microlens arrangement 12 is arranged at a distance from the collimator 13 of, for example, 0.3 mm. The area F to be illuminated may be arranged, for example, at a distance of 90 mm from the microlens arrangement 12. If the collimator 13 is a collimating lens, this lens may be made of the glass or the optical plastic AD5503.

What is claimed is:

1. A microlens arrangement having a plurality of microlenses arranged side-by-side and transversely to an optical axis of the microlens arrangement, wherein the microlenses have an entrance face and an exit face, through which light beams pass during operation of the microlens arrangement,
    wherein the entrance face of at least one of the microlenses is formed so that light beams of the same wavelength incident on the microlens at different height of incidence and oriented parallel to the optical axis each intersect the optical axis with a different back focal length, and wherein the entrance face is shaped so that the back focal length increases with the height of incidence, and
    wherein the exit face is configured to image peripheral points of the entrance face onto a flat area without distortion and, wherein the exit face is curved outwards.

2. The microlens arrangement according to claim 1, characterized in that the entrance face has a paraxial section and an abaxial section, wherein the refractive power of the entrance face decreases from the paraxial section towards to the abaxial section.

3. The microlens arrangement according to claim 1, characterized in that points of intersection with the optical axis of paraxial light beams are located inside the microlens and points of intersection with the optical axis of light beams passing through the entrance face in a peripheral region of the microlens are located outside of the microlens.

4. The microlens arrangement according to claim 1, characterized in that a focal length of the exit face is different from a center thickness of the microlens.

5. The microlens arrangement according to claim 1, characterized in that the exit face is formed less aspherical than the entrance face.

6. An illumination device for uniformly illuminating an area, comprising a light source and a microlens arrangement illuminatable with the light source, characterized in that the microlens arrangement is a microlens arrangement according to claim 1.

7. The illumination device according to claim 6, characterized in that the optical axis of the microlens arrangement is tilted with respect to another optical axis of the illumination device.

8. The illumination device according to claim 6, characterized in that the light source is spaced apart from another optical axis of the illumination device.

9. The illumination device according to claim 7, characterized in that the illumination device comprises a collimator, wherein the light source is arranged in the object-side focal plane of the collimator, and wherein the collimator is arranged between the light source and the microlens arrangement along an optical path extending from the light source to the microlens arrangement, wherein the optical axis of the collimator is the other optical axis of the illumination device.

* * * * *